United States Patent [19]

Salomon

[11] Patent Number: 4,983,289

[45] Date of Patent: Jan. 8, 1991

[54] SCREEN BOWL CENTRIFUGE

[75] Inventor: Salomon M. Salomon, Brookline, Mass.

[73] Assignee: Bird Machine Company, Inc., South Walpole, Mass.

[21] Appl. No.: 305,423

[22] Filed: Feb. 1, 1989

[51] Int. Cl.[5] .......... B01D 33/06

[52] U.S. Cl. .......... 210/360.1; 210/380.1; 210/498

[58] Field of Search .......... 210/360.1, 363, 370, 210/371, 380.1, 380.3, 498

[56] References Cited

U.S. PATENT DOCUMENTS

| | | | |
|---|---|---|---|
| 1,572,299 | 2/1926 | McEntire | 494/51 |
| 1,806,241 | 5/1931 | Dupuis | 494/53 |
| 3,401,800 | 9/1968 | Stock | 210/380 |
| 3,491,888 | 1/1970 | Colbuyn et al. | 210/380.1 |
| 3,713,541 | 1/1973 | Nelson | 210/415 |
| 3,957,762 | 5/1976 | McGonigal | 210/498 |
| 4,283,278 | 8/1981 | Savage et al. | 210/498 X |
| 4,309,284 | 1/1982 | Morimoto | 209/273 |
| 4,320,006 | 3/1982 | Kikachi | 210/380.1 X |

FOREIGN PATENT DOCUMENTS

| | | |
|---|---|---|
| 3142805 | 5/1983 | Fed. Rep. of Germany . |
| 496402 | 11/1919 | France . |

*Primary Examiner*—Charles Hart
*Attorney, Agent, or Firm*—Fish and Richardson

[57] ABSTRACT

A screen bowl centrifuge having slots which have successive portions which slope lengthwise toward a common axis, and additionally, slots which slope laterally toward the common axis. The screen bowl centrifuge may also have slots which conform to the predominant path of solids through the centrifuge by providing helically shaped screen bowl elements.

22 Claims, 2 Drawing Sheets

FIG. 1
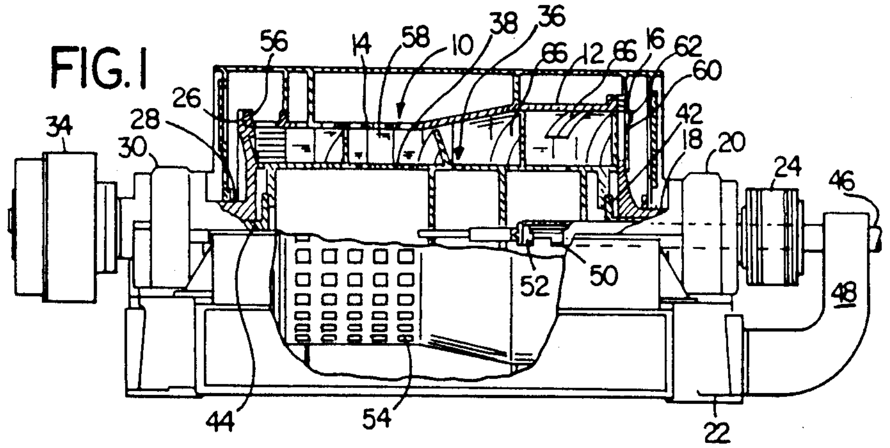
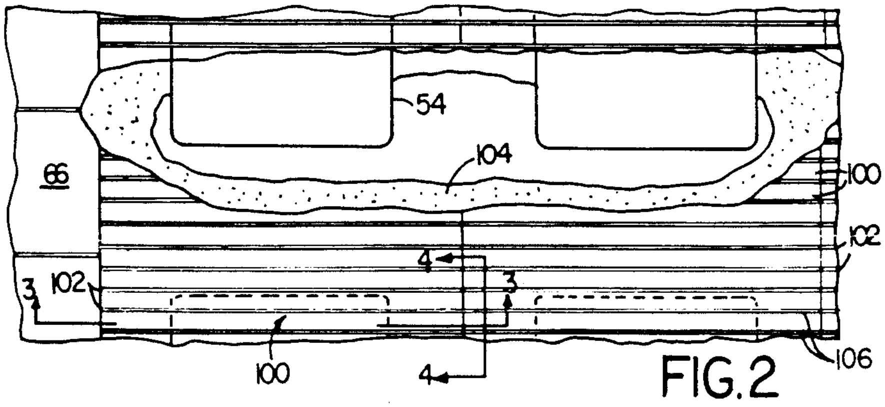
FIG. 2
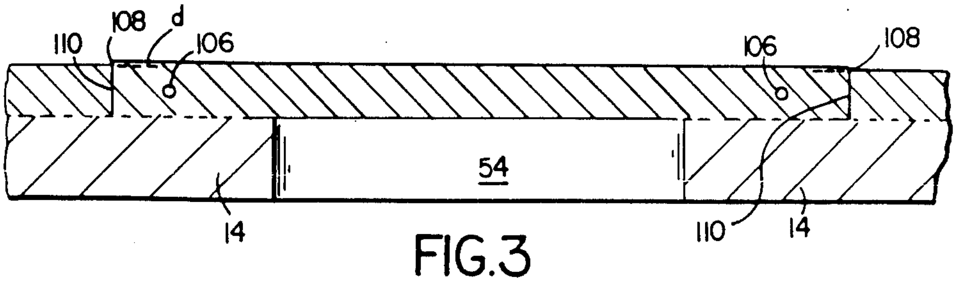
FIG. 3

SCREEN BOWL CENTRIFUGE

FIELD OF THE INVENTION

This invention relates to solids-liquid separating centrifuges which have a rotary bowl including a screen section, a rotary helical conveyor mounted coaxially therein and means for rotating the bowl and conveyor about their common axis in the same direction at a differential speed. More particularly, the invention relates to improvements in the screen section of the bowl of such centrifuges and to the manufacturer thereof.

BACKGROUND OF THE INVENTION

Centrifuges of the type concerned are called "screen bowl" centrifuges to distinguish them from centrifuges of the same type but without a screen section called "solid bowl" centrifuges. In some screen bowl centrifuges of the prior art, the screen section has formed all or nearly all of the bowl. In others, the screen section follows a solid bowl section in which the primary separation of solids from liquid takes place, the screening section serving to drain and dry the solids preliminary to discharge. While the invention is generally applicable to screen bowl centrifuges, it is described and illustrated herein as applied to such centrifuges of the latter form.

The screen section of screen bowl centrifuges has been typically formed as a lattice of crossing axial and radial ribs defining spaced openings in which screen inserts are secured. The ribs and screen inserts form an inner surface of substantially constant radius from the bowl axis, over which the solids are moved toward an outlet by the helical conveyor. An example of such a screen bowl centrifuge is disclosed in U.S. Pat. No. 3,401,800, where in the screen inserts have a screen portion of which the inner surface is curved at the radius of the inner surface of the cross-rib lattice and a support frame portion with side and end flanges which overlap the outer surface of the sides and ends of the opening in which the insert is placed and are secured thereto. The screen portion is formed of parallel bars secured at their ends to the frame and closely spaced to provide narrow screening slots, the ribs and slots being arranged to extend transversely to the centrifuge axis, that is, circumferentially of the bowl and bridging the opening.

Screen bowl centrifuges in accordance with said patent disclosure have had extensive commercial use despite certain shortcomings, such as rapid wearing away and breakage of the screen bars and plugging of the screen, particularly when exposed to hard, abrasive solids, as, for example, in the dewatering of coal fines. The wearing, breakage, and plugging, is, e.g., caused by wedging particles between the conveyor blade and the screen. To alleviate the plugging problem, the screen bars have been formed of tapered cross-section, so that the slots enlarge outwardly as shown in the aforesaid patent. However, this aggravates the wear problem, since the narrowest, correctly sized portion is of nearly zero depth and can be quickly worn away to an unacceptably large slot width while plugging by hard particles is not materially inhibited.

Efforts have been made to mitigate the wear and breakage problem in commercial screen bowls by the use of hard, highly wear resistant materials, such as chromium surfacing on stainless steel screen bars, or forming the bars of ceramic material or sintered tungsten carbide. The results of such efforts up to now have been disappointing. While the hard material improved wear resistance so long as it remained intact, breakage occurred too soon and too extensively. In the coated bars, cracking or breakage occurred in places where hard trapped particles were forced against it, such cracking or breaking resulting in stripping of the coating from large contiguous areas. The hard material of the bars was prone to break apart, usually near their ends. Since it was thought that pressure across bars circumferentially arranged might be the primary cause of breakage, the hard, wear resistant bars have been rearranged in some commercial machines so that they are parallel rather than normal to the bowl axis, but this has not materially helped the problem either with bars formed of, or coated with, wear resistant materials.

SUMMARY OF THE INVENTION

It has been found that a primary cause of the screen bowl screen wear, breakage and plugging problems has been hard, irregular particles in the feed which can freely penetrate part way into the screening slots but have a maximum dimension too great for the particle to pass through. Such particles, becoming wedged in the slots, increase the resistance of the screen to solids passage thereover and multiply the pressure exerted on the screen by increasing the torque load. The radial component of this pressure seeks to force the particles through the slots which they cannot pass, placing the bars under great lateral as well as radial pressure. Eventually, unless the screen is unplugged, this pressure either forces these particles to wear their way out of the grooves or hard surfacing on the bar ruptures, or the bars themselves break, under the lateral strain.

This invention provides novel features of construction of screen bowl screens which, primarily because they alleviate the hard particle wedging problem as just discussed, reduce screen plugging, wear and breakage, particularly when, as is possible and preferred, the features are used in conjunction.

In all of these features, the centrifuge has a rotary bowl including a screen section, a rotary helically bladed conveyor mounted co-axially therein, means for rotating the bowl and conveyor about their common axis in the same direction at a differential speed, means for feeding a solids-liquid slurry into the bowl and means defining an outlet from the bowl for solids moved through the screen section by the conveyor.

The first two features of the invention concern the radially inner surface of the screen means that lies between and defines the screening slots. According to one such feature, the radially inner surface of the screen means slopes between successive slots laterally toward the common axis so that one of the radially inner side edges of the slots is closer to that axis than the other. The radially inner side edge closer to the axis is the trailing edge longitudinally of the conveying face of the conveyor.

This feature is useful with slots disposed more axially than circumferentially and vice versa. In either case, the conveyor is applying circumferential as well as axial components of force to the solids. With the slots disposed more axially than circumferentially, as is preferred, such inclined surfaces offer resistance to the circumferential force components in the direction of the edge closer and tend to keep the flow of solids more nearly parallel to the slots than it would otherwise be. Any movement of solids by the circumferential force components across the slots in the opposite direction is resisted by the edge closer to the axis, which acts to guide the particle flow parallel to the slots.

On the other hand, with the slots disposed more circumferentially than axially, the path of general movement of the solids by the conveyor is more nearly across the slots, from the edge further from the axis to the edge closer to it, reducing the likelihood of particles being trapped and wedged in the slots.

According to the other such feature, the slots are disposed over the screening section, either parallel to the bowl and conveyor common axis, or at an angle thereto up to and including a 90° angle. Between slots, the radially inner surface is formed in successive portions which slope toward the common axis, so that one of the ends of these portions of the screen section are closer to the axis than their opposite ends and than the adjoining end of the succeeding portion. By virtue of this construction, the slots have open ends for part of their depth at each juncture of the successive portions, these affording opportunity at the juncture intervals for particles with trapped portions sliding due to the conveying face of the conveyor to escape freely.

Preferably, the slots are arranged to extend generally longitudinally of the screen section and to extend the full axial length of the screen section. They are preferably formed of bars of abrasive resistant material arranged in sets abutted end to end to define the slots between them, the abutted ends overlying and being secured to the opposite sides of apertures of an aperture supporting bowl portion. The abutted bars provide the successive sloping inner surfaces and slot end outlets. While the bars can be secured to the supporting bowl structure in tilted position to provide the end-to-end slope, that is preferably built-in by tapering the bars end-to-end so they may be secured flat to the supporting bowl structure.

This feature greatly alleviates wear, breakage and plugging at slot ends which my studies have indicated was a primary cause of the failure of axis parallel slot screens of the prior art. The latter were generally provided in short segments inset flush with intervening support structure as are the circumferential segments in U.S. Pat. No. 3,401,800 aforesaid. Particles sliding along the short slots had to "climb" out the ends against centrifugal force applied through the overlying solids layer, which provided too difficult in many cases. Instead, they stuck, backed up and soon caused breakage and/or extreme wear.

In both this feature and the first feature discussed, the difference between maximum and minimum distances from the common axis produced by the sloping should be small enough not to interfere with close clearance between the conveyor blade and the screen inner surface. Such close clearance should be maintained to insure that the solids cake as a whole will slide over the screen surface and not form a resident layer thereon, which would seriously impair the desired dewatering action of the screen as well as substantially increasing the torque load. In preferred constructions, this difference is about 0.015 inch. When both longitudinal and lateral sloping is provided, as is preferred, the difference in distance of the inner surface from the axis will be greatest between the end corner leading and the opposite end corner trailing in the direction longitudinal of the conveying force of the conveyor.

The objective of another feature of the invention is to conform the position of the screen bowl screen slots more closely to the predominant path of movement by the conveyor of hard solids in contact with the surface of the screen means than they are when positioned in a straight path parallel to the common axis.

According to this feature of the invention, the screen section of the bowl comprises slotted screen means, the slots communicating the interior of the screen section with the interior of the bowl and lying substantially along helical paths which are at an angle to the common axis facing the solids discharge end of the screen section greater than 5°. My studies of wear patterns in screen bowl centrifuges have shown that the predominant path of movement of hard solids in contact with the screen is not a straight path parallel to the common axis, but is a helical path at an angle to the common axis. The extent of this path angle is related to the helix angle of the conveyor blade, so that, in general, the greater the helix angle, the greater the angularity of the helical particle path to the common axis, that is, the angle of the path to the common axis that faces the discharge end of the screen section.

If the conveyor blade helix angle were small enough, less than 2°, the angle of particle flow direction to the axis would be about 5° or less, insufficient to be a major contributing cause to any excessive wear or breakage. Unfortunately, such low helix angles can rarely be used for the conveyor blade. The helix angles of practical use are greater, generally considerably greater, so that the angularity to the axis of the screen contacting particle flow is greater than 5°, normally falling within the range of about 15° to 41°.

The angle of particle flow referred to, while primarily a function of the helix angle of the conveyor, is also influenced to some extent by other factors, such as surface finish of the solids contacting surfaces of the screen and conveyor, physical-chemical characteristics of the material treated and its amount of moisture, direction of screen slots, conveyor clearance and the differential speed of the conveyor to that of the bowl. However, the actual path for a given set of these factors can be located with reasonable accuracy by wear path tests. Moreover, it has been determined empirically that the actual path is predictable as within ±5° of three times the helix angle of the conveyor blade portion within the screen section, the 5° latitude covering the effects of other influencing factors such as mentioned above.

By arranging the slots so that they are closer to the path of movement of the solids contacting the screen than has previously been the case, the troublesome particles of the wedging type are moved more readily longitudinally and out the ends of the slots rather than wedging, the marked improvement in screen wear, breakage and plugging is obtained, particularly when, as is preferred, this feature is combined with others, as discussed.

DESCRIPTION OF THE PREFERRED EMBODIMENT

We first briefly describe the drawings.

FIG. 1 is a cut-away view of a screen-bowl centrifuge in accordance with the present invention.

FIG. 2 is a portion of the inside surface of the FIG. 1 centrifuge.

FIG. 3 is an enlarged view of the FIG. 2 screen elements along lines 3—3.

STRUCTURE AND OPERATION

Figure 4:
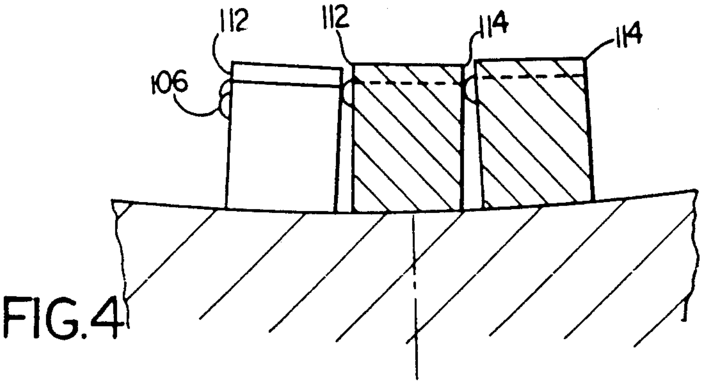
FIG. 4 is a cross-sectional view along lines 4—4 of the FIG. 2 screen bowl elements.

Referring to FIG. 1, the screen bowl centrifuge shown has a bowl designated generally 10, the peripheral wall of which has an imperforate, "solid section" 12 at one end and a perforated "screen section" 14 at the other end. Solid section 12 has a larger diameter, cylindrical outer end portion which extends for about half its length and then tapers conically to a smaller diameter equal to the lesser constant diameter of the screen section 14 at their junction.

A bowl head, designated generally 16, is bolted at its rim to the flanged outer end of solid section 12 and has a central sleeve shaft 18, coaxial with the bowl, which extends rotatably through bearing assembly 20 fixed on a mounting pedestal 22, and has fixed to its outer end a drive sheave 24 having belt drive connection to a motor (not shown) which rotates shaft 18 and the bowl. A second bowl head 26 is bolted at its rim to the flanged outer end of screen section 14 of the bowl, and has a central sleeve shaft 28, coaxial with the bowl, which extends rotatable through bearing assembly 30 fixed on a mounting pedestal 32, and is connected at its outer end to drive speed change gearing unit 34.

A helical conveyor, designated generally 36, has a cylindrical hub 38 on the exterior of which is mounted a helical conveyor blade 40 extending from the outer end of solid section 12 of the bowl to the discharge outer end of the screen section 14, with close clearance from the inner surface of the bowl sections 12 and 14. The end of conveyor hub 38 in the solid bowl section 12 has fixed thereto an integral, central sleeve shaft 42 extending coaxially into bowl sleeve shaft 18 with clearance therefrom and has an outer end portion (not shown) extending through the bearings in bearing assembly 20 in which it is rotatable mounted. The end of conveyor hub 38 in screen section 14 has fixed thereto a solid shaft 44 and extends coaxially into bowl sleeve shaft 28 with clearance, trough bearing assembly 30 in which it is rotatably mounted to the speed change gear assembly 34 to which it is operatively connected to a spliced end thereof (not shown).

Thus, the rotation of bowl 10 by the motor and drive sheave 24 rotates conveyor 36 in the same direction at slightly different speeds through speed change gearing unit 34. The conveyor may be rotated faster or slower than the bowl. In the illustrated embodiment it is driven at a slower speed than the bowl. Speed change gearing unit 34 has the usual shear pin or other torque sensing system (not shown), connected at its broken-away outer end, to prevent continued operation at excessive torque loads.

A pipe 46 fixed through a support arm 48 on pedestal 22 extends coaxially with clearance through sheave 24, bearing assembly 20, and sleeve shaft 42 into the adjacent end of conveyor hub 36. Pipe 46 is divided by an internal portion into pipes 50 and 52, pipe 50 having its discharge end located in a compartment formed between partitions in the conveyor hub 36 which is provided with outlet openings of the cylindrical portion of solid section 12 of the bowl. Pipe 52 has a reduced extension into a compartment formed between another partition in the conveyor hub and the opposite end of the hub to which compartment it discharges, and which is provided with outlet nozzles discharging to screen section 14 of the bowl. Pipe 50 is the feed pipe, for connection at its outer end to a suitable source of feed slurry (not shown). Pipe 52 is the wash liquid pipe, for connection at its outer end to a suitable source of wash water or other wash liquid (not shown).

Screen section 14 of the bowl 10 is provided with annular rows of apertures therethrough 54, which form this section of the bowl into a lattice of the axial and circumferential ribs intervening apertures 54. Preferably, as shown, the openings 54, are substantially square and are uniformly spaced apart a distance equal to their length and width dimension, which thus is the width of the ribs of the lattice. Discharge outlets 56 for the solids are provided at the outer end of the screen section. The interior of the screen section 12 up to the vicinity of discharge outlets 56 is covered by slotted screening means which is designated generally 58 and is the subject of detailed description later herein.

Bowl head 16 is provided with supports 60 between which the liquid effluent separated in solid section 12 of the bowl flows out through openings in cover plate 62 of this bowl head. These openings are partially covered by weir plates (not shown) to the level of the liquid pool which it is desired to maintain in section 12.

A stationary casing 64 encloses bowl 10 and the bowl head, with clearance from enclosed rotating parts except at its end which have seals in which sleeve shafts 18 and 28 are respectively rotatable. The part of the casing above the bowl axis is separately removable from the lower part, and has hand holes with removable covers in its respective ends, to afford access to the interior. A series of annular petitions divides the casing into compartments. As can be seen from FIG. 1, these are end compartments for receiving the liquid effluent from solid section 12 and the solids from the screen section 14 of the bowl, respectively; a compartment for receiving the liquid passing through the last row of apertures 54 in the bowl of the screen section; a compartment receiving the remainder of the liquid drained from the screen section; and an over flow compartment extending there from to the effluent compartment. Means (not shown) are provided for separately removing the solids from the solids-receiving compartment and the liquid from each of the other compartments.

The centrifuge shown is designed for treatment of slurries of highly abrasive materials such as coal fines, for which purpose, preferably, the inner surface of the solid section 12 of the bowl, the inner surface of the discharge end of the screen section 14 and the solids engaging portion of the working face of conveyor blade 40 are clad with abutting tiles 66 of a hard, more abrasion resistant material than stainless steel of which the bowl is customarily formed, such as ceramic material or tungsten carbide, the tiles being cemented to the surfaces which they cover.

In operation of the centrifuge, the solids of the slurry, fed into the cylindrical portion of solids section 12 of the bowl from feed sub-pipe 50 through its discharge compartment in conveyor hub 38, settle toward the bowl inner wall under the centrifugal force. The bowl is rotated in a counterclockwise direction viewed from the right end of FIG. 1. Since the conveyor is rotated in the same direction at a slightly slower speed, the conveyor is in effect rotated in the opposite or clockwise direction relative to the bowl and pushes the settled solids from right to left in FIG. 1, out of the cylindrical portion of bowl section 12, into and through conical portion 12, into and through screen section 14 of the bowl and out its discharge apertures 56.

The effluent liquid in excess of the retained pool in solid section 12 of the bowl is discharged through apertures 62, the weirs of which are normally set for a pool inner surface diameter greater than the minimum diameter of the small end of the conical portion of section 12, which thus has this end partly out of the pool to act as a drainage deck. When wash liquid from pipe 52 is used, it is through the conveyor to the solids in the screen section 14 joins the effluent fraction which passes the screen and is collected for withdrawal in two compartments in casing 64. The close clearance previously mentioned between the conveyor blade and the bowl is from the tiles 66 which form its inner surface.

FIGS. 2 and 3 show portions of the preferred screen means 58 of the invention, on an enlarged scale from that used in FIG. 1, the scale of FIG. 3 being slightly larger than that of FIG. 2. The inside surface plan view of FIG. 2 is of a small angular and axial fragment at the discharge end of the screen section but sufficiently shows the like construction at the opposite inlet end and between the ends. As can be seen, the screen means 58 is formed of bars, designated generally 100, molded of wear resistant material, preferably sintered tungsten carbide, which are of the same dimensions including a length approximately twice that of the bowl apertures 54.

Bars 100 are arranged in axial sets extending longitudinally of the bowl of the full length of the screen section, with their ends abutted at substantially the center line of the circumferential ribs intervening the apertures 54. They are of sufficient number to extend the full axial length of the screen section between the tiles 66 forming the interior face of the smallest diameter of solid section 12 of the bowl and the tiles 66 at the outlet portion of screen section 14. These axial sets of the bars are arranged in equally spaced, parallel relation in circumferential pairs sufficient in number to cover the full inner circumference of aperture bowl section 14 between respective end sets of tiles 66, so that the bars define between those slots, designated generally 102, of substantially uniform width extending the full length of the screen section up to its discharge end, and of substantially uniform circumferential spacing about the entire circumference of the screen section.

The slots 102 which overlie axial sets of apertures 54 and intervening circumferential ribs of the bowl function as screening slots. Even where overlie the circumferential bowl ribs, they tend to drain liquid to the apertures 54 at either side of the rib. The slots overlying the axial ribs of the bowl lattice do not have this drainage function, and actually are not required in this region, which can be formed of end-abutted, solid tiles the width of the axial ribs and the same height as the bars. However, the construction shown is preferred because of other functional attributes slots in these areas, as will be described later herein.

Bars 100 are secured to the bowl ribs which they, or end portions thereof, overlie by a thin layer of cement.

Bars 100 are secured to the bowl ribs which they, or end portions thereof, overlie by a thin layer of cement 104, preferably epoxy resin cement such as its used for attaching tiles 66 to the bowl. As presently preferred, the bars are hand-laid. An angular segment of full length of the aperture bowl portion is first coated with a substantially uniform layer of the cement, the annular width of the segment being such that the laying of bars therein can be competed before the cement starts to set. A first axial set of bars is then laid from end to end of the cemented segment of the bowl, care being exercised that the bars are abutted end to end with their sides parallel to the bowl axis and in axial alignment. To facilitate the laying of subsequent axial sets of bars each bar 100 is provided on one side with a spacer 106 adjacent each end, spaced somewhat below the top of the bar and projecting laterally from the bar side a distance equal to the desired spacing between bars in the zone of the spacers. Utilizing abutment of spacers 106 with the non-spacer side of the next bar beside it to facilitate spacing and alignment, the next axial abutting bar set is laid in parallel alignment with the first, and so on until the cemented segment has been completed. Adjacent segments are then cemented and the bars applied thereto in spacer-aided alignment with bars already laid, until the entire circumference of the spaced bars. Spacers 106 are preferably as shown hemispherical with a radius equal to the desired slot width, which in the embodiment shown is about 0.03 inch, and they are most conveniently molded integral with the bars. They are spaced below the tops of the bars an amount at least approximately equal to their radius.

The section view of FIG. 3 shows a features of the invention which cannot be seen in FIG. 2, which is that the end 108 of each bar further from the inlet end of the screen section (and consequently the nearer bar end to the discharge end of the screen section shown to the left in FIG. 3) is closer to the axis of the bowl than its opposite end 110 and than the corresponding end 110 of the bar which it abuts, preferably by virtue of the bar having been molded with its top surface (as it is to be laid) having a slope toward its opposite surface from end 108 to end 110. The bars are laid uniformly with the ends 108, 110 of the bars abutting as shown, so that the upper part of each slot 102 between axial, abutted bars terminates at each juncture for a depth equal to the difference between the distance from the bowl axis of the bar ends 108 and 110 respectively, this terminated end slot portion being indicated by the dotted line d in FIG. 3. Though this difference has to be small to maintain the requisite conveyor close clearance as previously indicated, it is important to enable solid particles with portions caught in the slots to escape the slots freely out these open ends.

Figure 5:
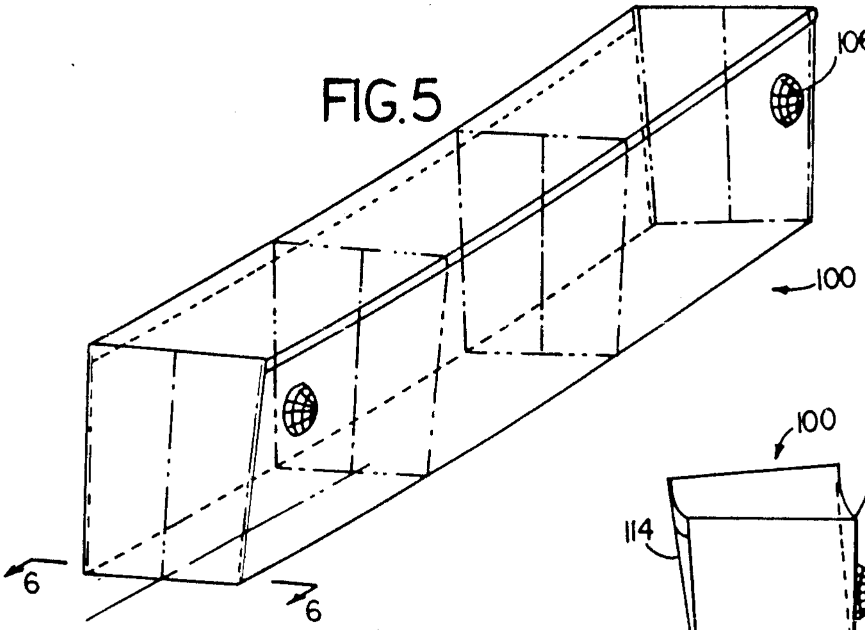
FIG. 5 is a perspective view of a screen bowl element in accordance with the present invention.
Figure 6:
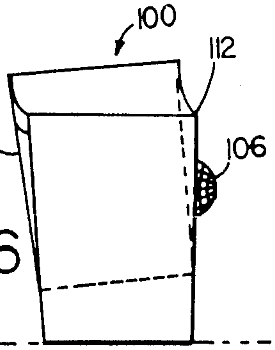
FIG. 6 is a view along the lines6—6 of the FIG. 5 screen bowl element.

The cross-sectional shape of the bars may be substantially square, except as modified by the end-to-end slope just described, and except as one or both side edges may be slanted inwardly near the surface secured to the bowl to provide greater slot width. However, it is preferred to modify the shape further according to another feature incorporated in the bars as shown in FIGS. 4, 5 and 6.

As shown in FIG. 4, bars 100, in addition to the longitudinal taper just described, have a side edge to side edge taper so that one edge 112 of bar 100 is closer to the axis of the bowl than the other edge 114, preferably provided by molding another taper in thickness into the bar, from thicker edge 112 to thinner edge 114. Thus, the sidewall of each slot formed by thicker side edge 112 has its exposed edge closer to the axis of the bowl than its opposite sidewall formed by thinner bar side edge 114.

Additionally, each bar 100 may have a slight helical shape. Thus, when bars 100 are uniformly laid, bars 100 lie substantially along helical paths which are at an angle to the common axis facing the solids discharge end of the screen section greater than 5°. This path conforms to the predominant path of movement of hard solids in contact with the surface of the screen means. The extent of this path angle is related to the helix angle of the conveyor blade. This angle is generally greater than 5° and more specifically is within ±5% of three times the helix angle of the conveyor blade portion within the screen section.

The 5° latitude of the helix angle compensates for other influencing factors, such as surface finish of the solids contacting surfaces of the screen and conveyor, physical-chemical characteristics of material treated and its amount of moisture, direction of screen slots, conveyor clearance and the differential speed of the conveyor to that of the bowl. In many applications, this angle is between approximately 15° and 41°.

What is claimed is:

1. A solids-liquid separating centrifuge having:

a rotary bowl including a screen section, a rotary, helically-bladed conveyor mounted coaxially therein, means for rotating said bowl and conveyor about their common axis in the same direction at a differential speed, means for feeding a solids-liquid slurry into said bowl, and means defining an outlet from said bowl for solids moved through said screen section by said conveyor, said screen section comprising slotted screen means, the slots whereof communicate the interior of said screen section with the exterior of said bowl and lie substantially along parallel helical paths which are at an angle to said common axis facing the solids discharge end of said screen section which is greater than 5°.

2. A centrifuge according to claim 1 wherein said paths angle is within ±5° of three times the helix angle of the portion of the helical blade within said screen section.

3. A centrifuge according to claim 1 wherein said paths angle is between approximately 15° and 41°.

4. A centrifuge according to claim 1 wherein said screen section comprises an aperture bowl portion and said screen means comprises a plurality of bars bridging the apertures of said bowl portion and laterally spaced to form said slots.

5. A centrifuge according to claim 4 wherein said bars are helically shaped to approximately conform to said helical path.

6. A centrifuge according to claim 4 wherein said bars are arranged in sets abutted end to end to form continuous slots between the abutted sets extending the full axial length of said screen section.

7. A centrifuge according to any of claims 1 to 6 wherein the radially inner surface of said screen means is formed of a material at least approximately as resistant to abrasive wear as tungsten carbide.

8. A solids-liquid separating centrifuge having:

a rotary bowl including a screen section, a rotary, helically-bladed conveyor mounted coaxially in said bowl and screen section, means for rotating said bowl and conveyor about their common axis in the same direction at a differential speed, means for feeding a solids-liquid slurry into said bowl, and means defining an outlet from said bowl for solids moved through said screen section by said conveyor, said screen section comprising slotted screen means, the slots whereof communicate the interior of said screen section with the exterior of said bowl, said screen means lying between and defining the sides of a plurality of successive slots, each said slot having a radially inner surface thereof sloping in the same direction toward said common axis as a radially inner surface of adjacent slots so that a first radially inner side edge of a said successive slot is closer to said common axis than a second radially inner side edge of said slot, said first radially inner side edge being the trailing edge relative to the conveying face of said conveyor.

9. A centrifuge according to claim 8 wherein said screen means between said plurality of successive slots is formed by laterally spaced bars which are tapered in thickness from side to side to provide said sloping inner surface.

10. A centrifuge according to claim 8 wherein the maximum difference in thickness of said bars is between 0.01 and 0.12 inch.

11. A centrifuge according to claim 9 wherein said sloping inner surface of said bars is formed of a material at least approximately as resistant to abrasive wear as tungsten carbide.

12. A centrifuge according to claim 11 wherein said bars are formed essentially of tungsten carbide.

13. The centrifuge of claim 8 wherein said slotted screen means define the sides of a plurality of said slots having successive portions of the radially inner surface thereof sloping toward said common axis so that one of the ends of said portions of said screen section are substantially uniformly closer to said axis than their opposite ends and than the adjoining end of the succeeding portion, and so that said plurality of slots have open ends for part of their depth at each juncture of said successive portions, said one of the ends of said portions being a trailing portion relative to the conveying face of said conveyor.

14. A centrifuge according to claim 13 wherein said slotted screen means are arranged to extend generally longitudinally of said screen section.

15. A centrifuge according to claim 14 wherein said plurality of slots each extend the full axial length of said aperture bowl portion.

16. A centrifuge according to claim 15 wherein said screen means between said plurality of slots is formed essentially of bars arranged in laterally spaced, endwise abutted sets to form corresponding slots, said screen section comprising an aperture bowl portion which said abutted ends overlay and to which said abutted ends are secured between said aperture, successive abutted bars providing said successive sloping inner surface portions of said screen means.

17. A centrifuge according to claim 16 wherein said bars taper in thickness from end to end to provide said sloping inner surface portions.

18. A centrifuge according to claim 16 wherein said radially inner surface of said bars is formed of a material at least approximately as resistant to abrasive wear as tungsten carbide.

19. A centrifuge according to claim 18 wherein said bars are formed essentially of tungsten carbide.

20. A centrifuge according to claim 13 wherein the maximum difference in the distance from said common axis of said sloping inner surface portions is between 0.01 and 0.02 inch.

21. A centrifuge according to claim 8 wherein said plurality of slots lie substantially along parallel helical paths which are at an angle to said common axis facing the discharge end of said screen greater than 5°.

22. A centrifuge according to claim 9 wherein said plurality of slots lie substantially along parallel helical paths which are at an angle to said common axis facing the discharge end of said screen greater than 5°.

* * * * *